(12) United States Patent
Weddendorf et al.

(10) Patent No.: US 9,109,575 B2
(45) Date of Patent: Aug. 18, 2015

(54) FLYING ELECTRIC GENERATORS WITH CLEAN AIR ROTORS

(75) Inventors: Bruce Weddendorf, Huntsville, AL (US); Colin Austin, Huntsville, AL (US); Greg Mercier, Madison, AL (US); Robert Austin, Huntsville, AL (US)

(73) Assignee: SKY WINDPOWER CORPORATION, San Rafael, CA (US)

( * ) Notice: Subject to any disclaimer, the term of this patent is extended or adjusted under 35 U.S.C. 154(b) by 346 days.

(21) Appl. No.: 13/479,011

(22) Filed: May 23, 2012

(65) Prior Publication Data

US 2012/0298793 A1 Nov. 29, 2012

Related U.S. Application Data

(60) Provisional application No. 61/488,894, filed on May 23, 2011, provisional application No. 61/488,902, filed on May 23, 2011.

(51) Int. Cl.
*F03D 1/02* (2006.01)
*F03D 5/00* (2006.01)

(52) U.S. Cl.
CPC .. *F03D 1/02* (2013.01); *F03D 5/00* (2013.01); *F05B 2240/921* (2013.01); *Y02E 10/72* (2013.01)

(58) Field of Classification Search
CPC ........ B64C 2201/027; F03D 1/02; F03D 5/00
USPC ...................................................... 244/17.23
See application file for complete search history.

(56) References Cited

U.S. PATENT DOCUMENTS

| 3,002,712 | A | * | 10/1961 | Beckwith .................... 244/17.23 |
| 3,053,480 | A | | 9/1962 | Vanderlip |
| 4,874,291 | A | * | 10/1989 | Roberts et al. ................ 416/122 |
| 4,930,988 | A | | 6/1990 | Griffith |
| 5,971,320 | A | * | 10/1999 | Jermyn et al. ............. 244/17.25 |
| 6,781,254 | B2 | * | 8/2004 | Roberts ........................... 290/55 |
| 7,109,598 | B2 | * | 9/2006 | Roberts et al. .................. 290/44 |
| 7,183,663 | B2 | * | 2/2007 | Roberts et al. .................. 290/44 |
| 8,292,215 | B2 | * | 10/2012 | Olm et al. ................... 244/17.23 |
| 8,646,720 | B2 | * | 2/2014 | Shaw ......................... 244/17.23 |

(Continued)

FOREIGN PATENT DOCUMENTS

| AU | 2010903821 | 8/2010 |
| AU | 2011901476 | 4/2011 |

(Continued)

OTHER PUBLICATIONS

International Search Report for PCT/US2012/039190, mailed Aug. 3, 2012.

(Continued)

*Primary Examiner* — Justin Benedik
(74) *Attorney, Agent, or Firm* — Dowell & Dowell, PC

(57) ABSTRACT

Flying electric generator aircraft that include groupings of four rotors mounted to booms extending fore and aft of a fuselage structure wherein the rotors are placed so that when the aircraft is facing the wind, each rotor has a direct path to an undisturbed flow of air, regardless of pitch angle and during all flight maneuvers of the aircraft. The rotors are placed in counter-rotating pairs with the booms preferably angled so that the rotors in the front of the aircraft are spaced at a distance from one another that is different than a spacing of the rotors at the rear of the aircraft.

10 Claims, 11 Drawing Sheets

(56) References Cited

U.S. PATENT DOCUMENTS

| | | | |
|---|---|---|---|
| 8,695,919 B2* | 4/2014 | Shachor et al. | 244/17.17 |
| 2005/0061910 A1* | 3/2005 | Wobben | 244/17.23 |
| 2006/0226281 A1* | 10/2006 | Walton | 244/17.23 |
| 2006/0266881 A1* | 11/2006 | Hughey | 244/17.23 |
| 2008/0006737 A1* | 1/2008 | Wobben | 244/17.13 |
| 2008/0048065 A1* | 2/2008 | Kuntz | 244/17.23 |
| 2009/0008499 A1* | 1/2009 | Shaw | 244/17.23 |
| 2010/0013226 A1 | 1/2010 | Blumer et al. | |
| 2010/0013236 A1* | 1/2010 | Carroll | 290/55 |
| 2010/0044499 A1* | 2/2010 | Dragan et al. | 244/17.23 |
| 2010/0108801 A1* | 5/2010 | Olm et al. | 244/17.23 |
| 2010/0243794 A1* | 9/2010 | Jermyn | 244/17.23 |
| 2010/0283253 A1* | 11/2010 | Bevirt | 290/55 |
| 2010/0295320 A1* | 11/2010 | Bevirt et al. | 290/55 |
| 2010/0295321 A1* | 11/2010 | Bevirt | 290/55 |
| 2011/0057453 A1* | 3/2011 | Roberts | 290/55 |
| 2011/0121570 A1* | 5/2011 | Bevirt et al. | 290/44 |
| 2012/0056041 A1* | 3/2012 | Rhee et al. | 244/4 R |
| 2012/0104763 A1* | 5/2012 | Lind | 290/55 |
| 2012/0138732 A1* | 6/2012 | Olm et al. | 244/17.23 |
| 2012/0152654 A1* | 6/2012 | Marcus | 182/129 |
| 2013/0105635 A1* | 5/2013 | Alzu'bi et al. | 244/23 A |

FOREIGN PATENT DOCUMENTS

| | | |
|---|---|---|
| WO | 2009/126988 A1 | 10/2009 |
| WO | 2010099447 | 9/2010 |
| WO | 2012024717 A1 | 3/2012 |

OTHER PUBLICATIONS

Time, Best Inventions of 2008: 35. Airborne Wind Power. <http://content.time.com/time/specials/packages/article/0,28804,1852747_1854195_1854174,00.html.

* cited by examiner

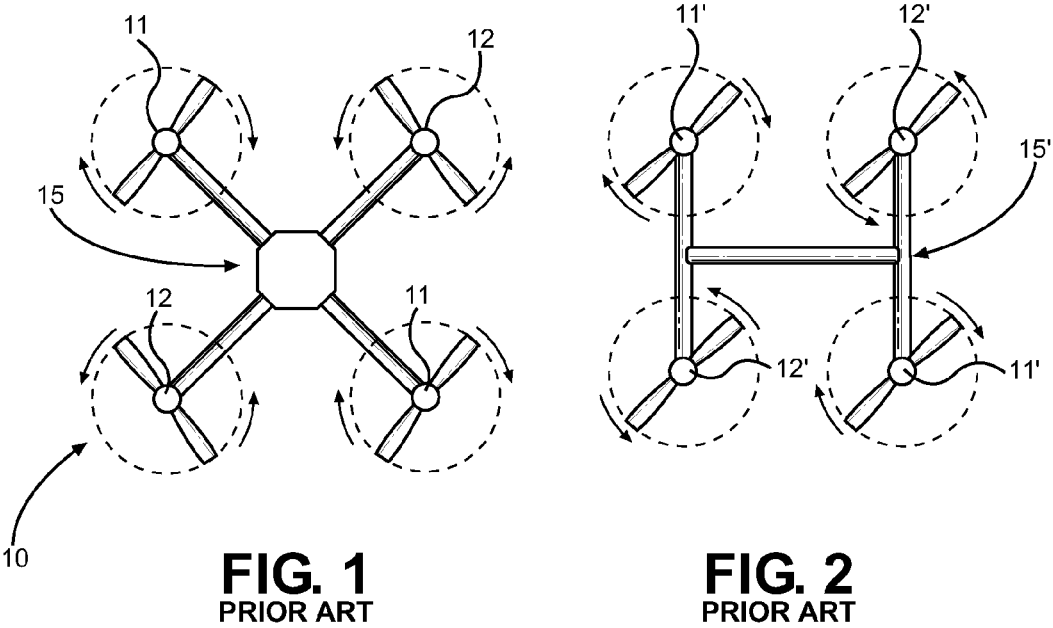
FIG. 1
PRIOR ART
FIG. 2
PRIOR ART
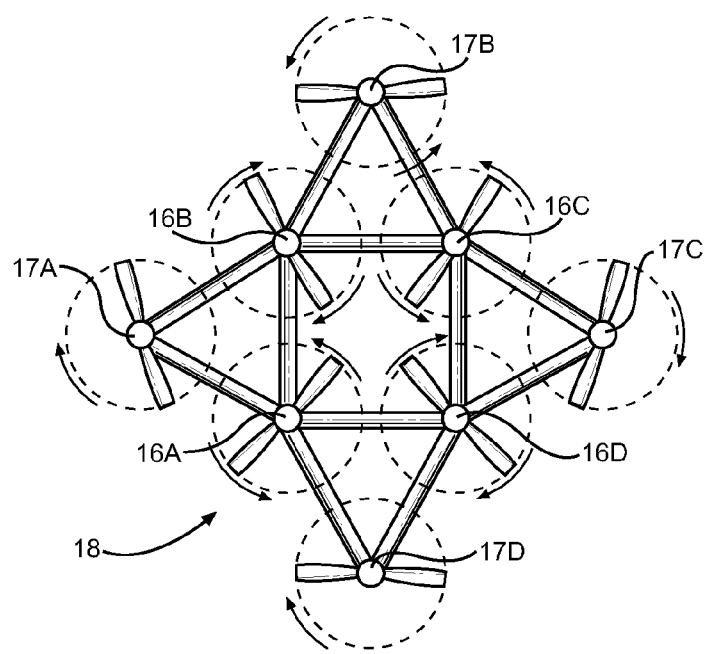
FIG. 3

FLYING ELECTRIC GENERATORS WITH CLEAN AIR ROTORS

BACKGROUND OF THE INVENTION

1. Field of the Invention

The present invention is directed to the field of flying electrical generators (FEGs) and, more particularly, to new configurations of Flying Electric Generators (FEGs) featuring rotors positioned on a frame or body such that each rotor receives clean air which is undisturbed by the other rotors mounted to the frame or body.

2. Brief Description of the Related Art

Flying Electric Generators are not new and several methods of extracting energy from high altitude winds have been proposed and are now in development. It is well known that the energy content in wind increases with distance from the ground (altitude). Current ground based wind turbine technologies attempt to take advantage of this fact by mounting wind driven rotors at greater heights and by extending blades to greater lengths. However, due to the cantilever design of ground based wind driven generators, there is a limit to their maximum height, as large and costly steel and concrete bases are required to counter the bending forces introduced by their necessary structural geometry. FEGs, in contrast, need only a thin, light tether attached to a small ground anchor point to counter or react to the force of the wind, and they can fly high above the ground and into the most concentrated and abundant natural energy source, the high altitude winds.

Currently, and as shown in FIGS. 1 and 2, autogyro rotor based FEGs, 10, 10', respectively, in development have at least four rotors, with two rotors 11, 11' and 13, 13' rotating in one direction, and two rotors 12, 12' and 14, 14' rotating in the other direction. The most commonly seen configuration includes four rotors mounted in a symmetric square pattern to an X-shaped frame or fuselage 15, as shown in FIG. 1, or to an H-shaped frame or fuselage, as shown in FIG. 2. Other symmetric configurations have been studied, including those with larger numbers of rotors with even numbers of sets of counter rotating pairs of rotors. For example, as shown in FIG. 3, an eight rotor FEG could have four rotors 16A-16D clustered in a square pattern, with four more rotors 17A-17D in another square pattern positioned 45 degrees to the rotors 16A-16D. As shown, the rotors which are diagonally positioned relative to one another in each square have blades rotating in one direction which is opposite that of the two other diagonally positioned rotors in each square. This configuration would be suitable for a hovering platform multi-rotor helicopter, but symmetrically spaced rotors create problems for FEG applications.

During flight of prior art FEGs, when an angle of attack of the rotors is at a relatively small angle, see the discussion below with respect to the angle of attack with respect to the FEGs of the present invention and shown in FIGS. 4 and 5, the downward component of the air flow emerging downwind of each forward rotor causes a reduction in thrust of an aft rotor directly downwind. This is because the downward component of flow behind the forward rotor changes the apparent wind direction for the aft rotor. The apparent wind experienced by an aft rotor downwind of a forward rotor has a downward component, which is equivalent to a relative reduction in pitch angle for that aft rotor. Reduction of pitch angle reduces thrust. The result of the loss of thrust in an aft rotor is a rapid and uncontrolled increase in vehicle pitch. During testing, this interaction was discovered and the present invention has been made to eliminate this problem.

The foregoing problem disappears when an angle of attack becomes large, but the problem area, flight in wind with taught tether at low positive pitch angles, must be traversed to achieve the larger angle of attack. At large positive angles of attack, the forward rotors are so far above the aft and downwind rotors that the downward-directed flow trailing the forward rotor does not always reach the aft rotor, and it operates in somewhat undisturbed air.

SUMMARY OF THE INVENTION

This invention is directed to configurations of rotor placements for FEGs that allow four rotors to operate in clean, undisturbed air during all flight maneuvers. The rotors are placed so that when the FEG is facing the wind, each rotor has a direct path to an undisturbed flow of wind, regardless of pitch angle. The rotors are placed in counter-rotating pairs so that the FEG is controlled in the same way as all previous FEG designs with tightly clustered rotors.

Advantages of the invention over related art include that an FEG can be controlled by means of varying thrust of rotors alone during all portions of flight from takeoff through power generation and landing. Because each rotor receives undisturbed direct wind energy at all phases of flight, there are no discontinuities in control based on angle of attack and wind speed. This allows for a smooth transition from takeoff and hovering flight to kite-like power generating flight. Previous FEG designs with closely clustered rotor placements would either need to be launched with a high angle of attack with a tight tether, or make an abrupt, partially controlled fast pitch maneuver from low angles of pitch to high angles of pitch where the closely spaced rotors will no longer cause loss of thrust in the downwind or aft rotors.

In accordance with the invention, a fuselage is configured having a central housing preferably fabricated from a combination of machined aluminum plates and formed sheets, but also could be fabricated from a multi-part or monolithic composite material. The central housing houses the avionics and computer systems necessary for FEG control, the electronics necessary to communicate with the ground, motor control electronics, and power conversion electronics. The housing includes a frame structure having upper and lower ring-like components. Four rotor support arms or booms, preferably formed as hollow tubes, are connected to the upper and lower ring-like components with two of the arms extending forward of the central housing and supporting forward rotors and two of the arms extending aft of the housing and support two aft rotors. The rotors are carried by rotor mounting assemblies secured to free ends of the arms.

The forward rotors are spaced closely to one another such that tips of the rotor blades pass close to one another as they rotate. The aft rotors are spaced farther apart relative to one another and they are not affected by air passing through the forward rotors such that only clean air, undisturbed wind, enters the blades of the aft rotors during flight. Preferably, the forward rotors are spaced apart at an angle of at least approximately 90° relative to one another and the angle may be greater, however, in the preferred embodiments, the aft rotors will be spaced apart at a greater angle than the forward rotors. Also, in preferred embodiments, the forward arms are shorter than the aft arms such that the forward rotors are more closely spaced relative to one another than the aft rotors.

An electric motor such as a permanent magnet DC servo motor is carried by each of the rotor mounting assemblies with each motor being mechanically connected to the rotor blades and electrically connected to separate electronic motor controllers mounted to the central housing. The motor controllers function as switching devices for permitting current flow to the motors from a ground power source connected thereto by electrical conductors which extend through the tether by way of which the FEG is connected to a ground anchor during flight. The current flow to the motors provides power to rotate the rotor blades during ascent and descent, and at some other times, during a flight of the FEG. However, during power generation flight in a kite-like mode of the FEG, the voltage generated by a regenerative braking of the motor drive shaft due to the power of the wind against the blades, the motor controller switches to allow current to flow from the motor to a ground level power grid, power storage device or some other device to be electrically powered by the FEG.

Also mounted to each rotor mounting assembly is a pitch control servo which controls the pitch angle of the rotor blades. The pitch control servo alters a position of a servo wheel or horn which is mechanically linked to a pitch control ring which is non-rotationally mounted about a vertically adjustable sleeve that is mounted to rotate with a blade support knuckle assembly. A pair of oppositely oriented blade grips, from which the blades of the rotor extend, are adjustable mounted to the knuckle assemble about an axis substantially perpendicular to the rotational axis of the rotor blades so as to change the pitch of the rotor blades depending upon the operation of the pitch control servo. Each blade grip includes a lever having a pitch horn which is mechanically connected to the pitch control ring such that as the ring is raised and lowered relative to the rotor knuckle assembly by the action of the pitch control servo, the pitch angle of the blades is changed.

The central housing of the fuselage also houses electrical connectors for connecting the electrical conductors in the FEG tether as well as a centrally mounted yoke for securing the tether to the frame of the housing.

BRIEF DESCRIPTION OF THE DRAWINGS

A better understanding of the present invention will be had with reference to the accompanying drawings wherein:

FIG. 1 is top plan illustrational view of a conventional prior art FEG having one configuration of placement where the rotors are mounted in a generally X-shaped configuration;

FIG. 2 is a top plan view similar to FIG. 1 but showing the rotors placed in an H-shaped configuration;

FIG. 3 is a top plan view of FEG having eight rotors mounted in two box shaped configurations with the outer box being offset approximately 45 degrees relative to the inner box;

DESCRIPTION OF THE PREFERRED EMBODIMENTS

With continued reference to FIGS. 4-13 of the drawings, the invention is directed an arrangement of rotors for an autogyro Flying Electric Generator (hereinafter FEG) 20 where all rotors are able to receive direct, undisturbed wind when the FEG is pointed or directed into the wind regardless of pitch angle. As shown in FIG. 6, in order for the FEG to be controlled by varying rotor thrusts as described herein, the rotors must be installed in sets of counter-rotating pairs, with at least four rotors. The rotors must be placed so that the center of gravity (CG) is at the geometric center of the rotor areas, and so that there is an equal distance from a rotor on the left of the CG to its counter-rotating counterpart on the right of the CG, also the distance of a rotor behind the CG must be equal to the distance of its counterpart ahead of the CG.

Figure 7:
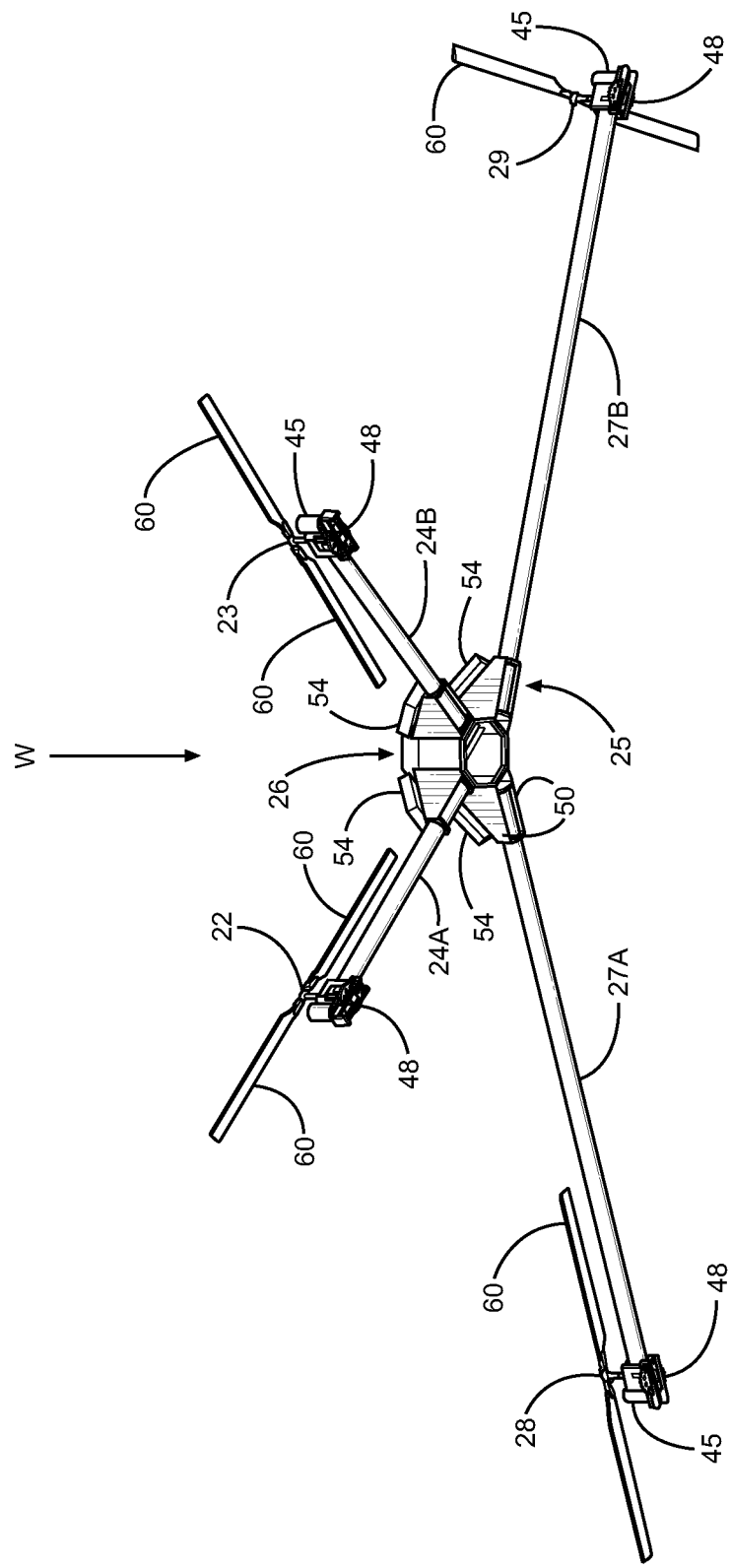
FIG. 7 is a bottom perspective view of a first embodiment of FEG of the present invention showing four rotors, four fuselage boom arms extending from a central control housing of the fuselage and drive motors for the rotors.

The simplest embodiment of this design is a FEG with four rotors, the front (upwind) pair of rotors 22 and 23 are mounted to forward extending rotor support arms or booms 24A and 24B of a fuselage 25 having a central housing 26 to which the arms 24A and 24B are mounted. The fuselage also has two rearwardly extending or aft arms or booms 27A and 27B to which a pair of aft or downwind rotors 28 and 29 are mounted. The forward rotors 22 and 23 are set near each other, as shown in FIG. 7, so that only a small distance separates the blade tips as they rotate. The aft rotors are spaced farther apart relative to one another so that they are not effected by air passing through the forward rotors such that only clean air, undisturbed wind, enters the blades of the aft rotors during flight. Preferably, the forward rotors are spaced apart at an angle of up to at least approximately 90° relative to one another, and the angle may be greater, however, in the preferred embodiments, the aft rotors will be spaced apart at a greater angle than the forward rotors. Also, in some embodiments, such as shown in FIG. 7, the forward arms are shorter than the aft arms such that the forward rotors are more closely spaced relative to one another than the aft rotors.

The forward rotors must rotate in opposite directions as shown by the arrows in FIG. 6, but the clockwise rotor may be either on the right or left. The aft (downwind) rotors 28 and 29 are spaced much farther apart and far enough apart such that a line L1 extending from the right tangent edge of a circle C1 swept out by the right forward rotor tip 23 does not intersect a circle C2 swept out by the right aft rotor tip 29. In a like manner, the rear left rotor tip must be spaced outwardly relative to a tangent line L2 extending from a left tangent edge of a circle C3 swept by the forward rotor tip 22 so that the line L2 does not intersect a circle C4 swept by the left aft rotor 28. The right and left rotors of the aft pair must also rotate in opposite directions, and each must rotate in the opposite direction from the front rotor nearest to it. This also means that each aft rotor is rotating in the same direction as the forward rotor on the opposite side of the FEG 20 from it.

Figure 4:
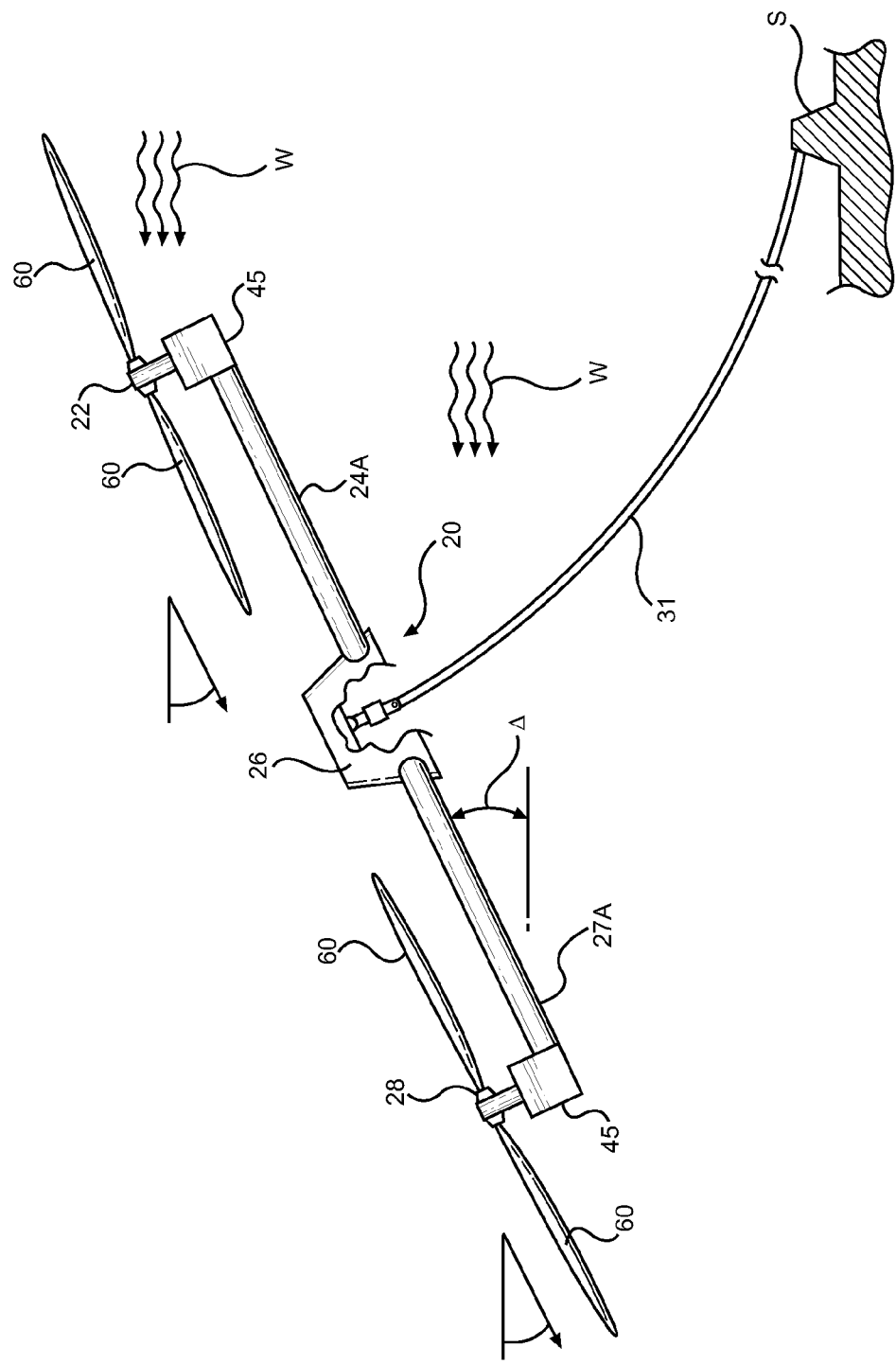
FIG. 4 is a side illustrational view of the FEG of the present invention shown in FIG. 7 having portions broken away with the FEG tethered to the ground with the angle of wind flow being shown downwardly from a front or fore rotor relative to a rear or aft rotor and showing the pitch angle of attack "Δ" of the FEG relative to a wind direction "W"
Figure 5:
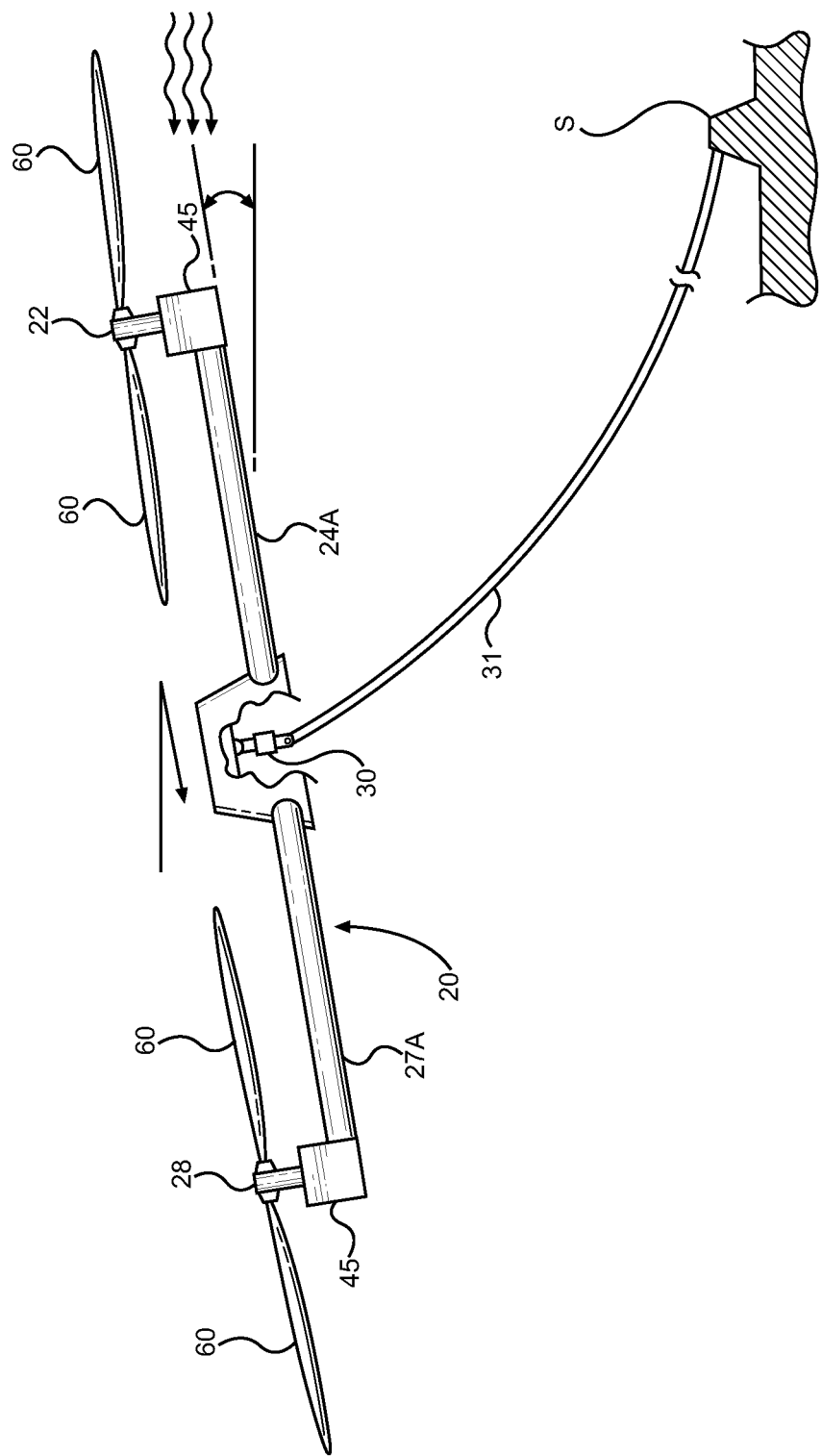
FIG. 5 is a side illustration view of the FEG of FIG. 4 showing an angle of attack with a reduced pitch angle.
Figure 6:
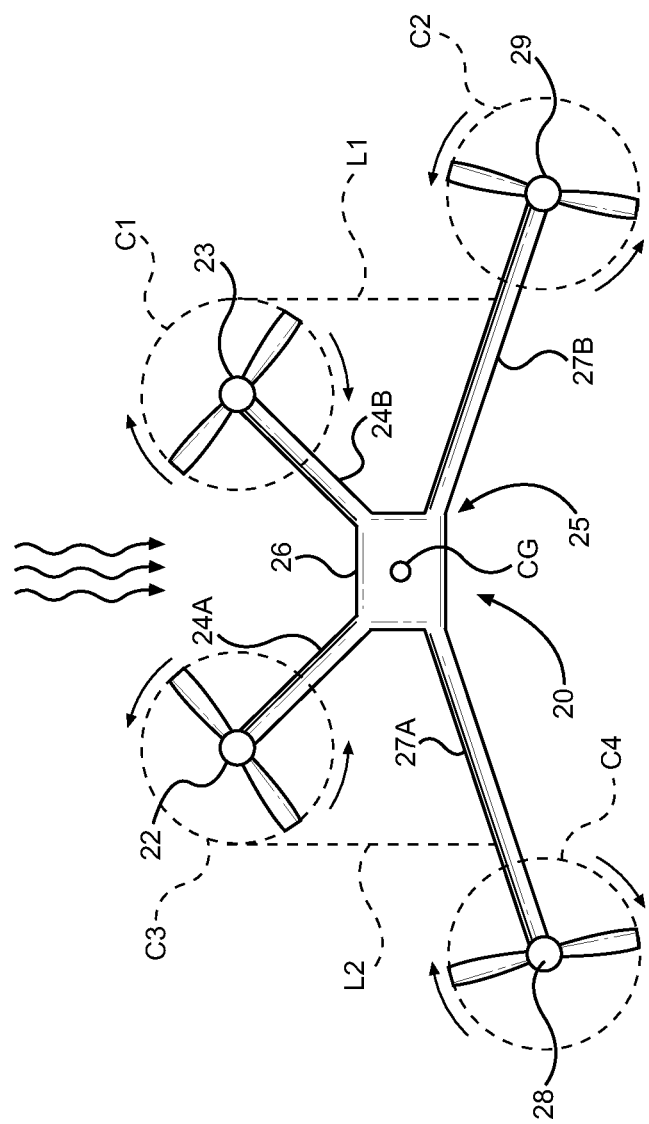
FIG. 6 is a bottom plan illustrational view of the FEG in accordance with the teachings of the present invention.

As shown in FIG. 7, the fuselage 25 includes a central housing 26 to which a tether 31 is secured and which extends to a ground station "S", see FIGS. 4 and 5. The tether 31 includes both an electrical cable and a reinforced anchor cable that is designed to permit deployment of the FEG 20 to high altitudes to facilitate power generation.

Figure 8:
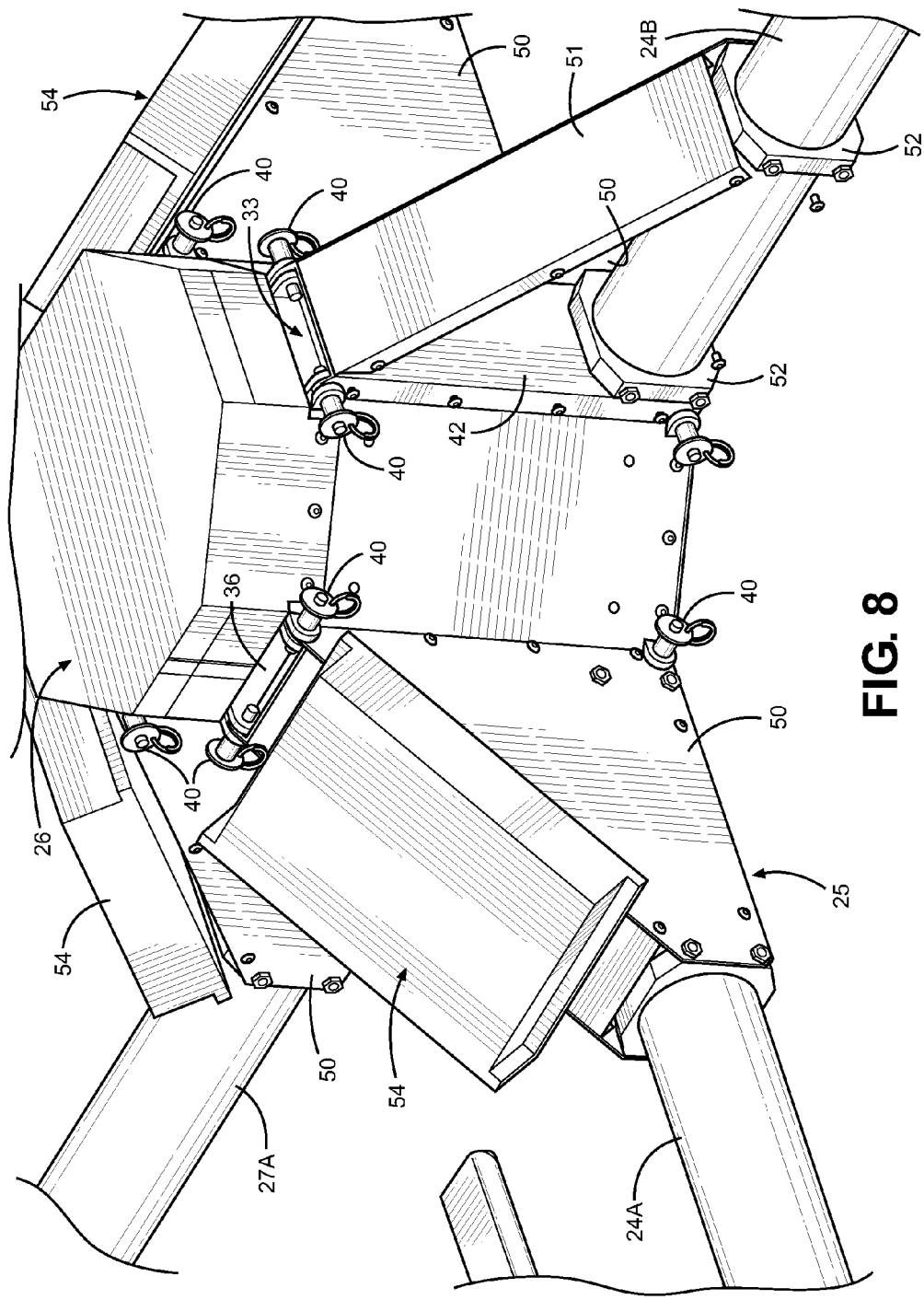
FIG. 8 is a perspective view of the central housing area of the fuselage of the FEG of FIG. 7 having portions broken away to show the mounting of one of the rotor support boom arms of the fuselage.
Figure 9:
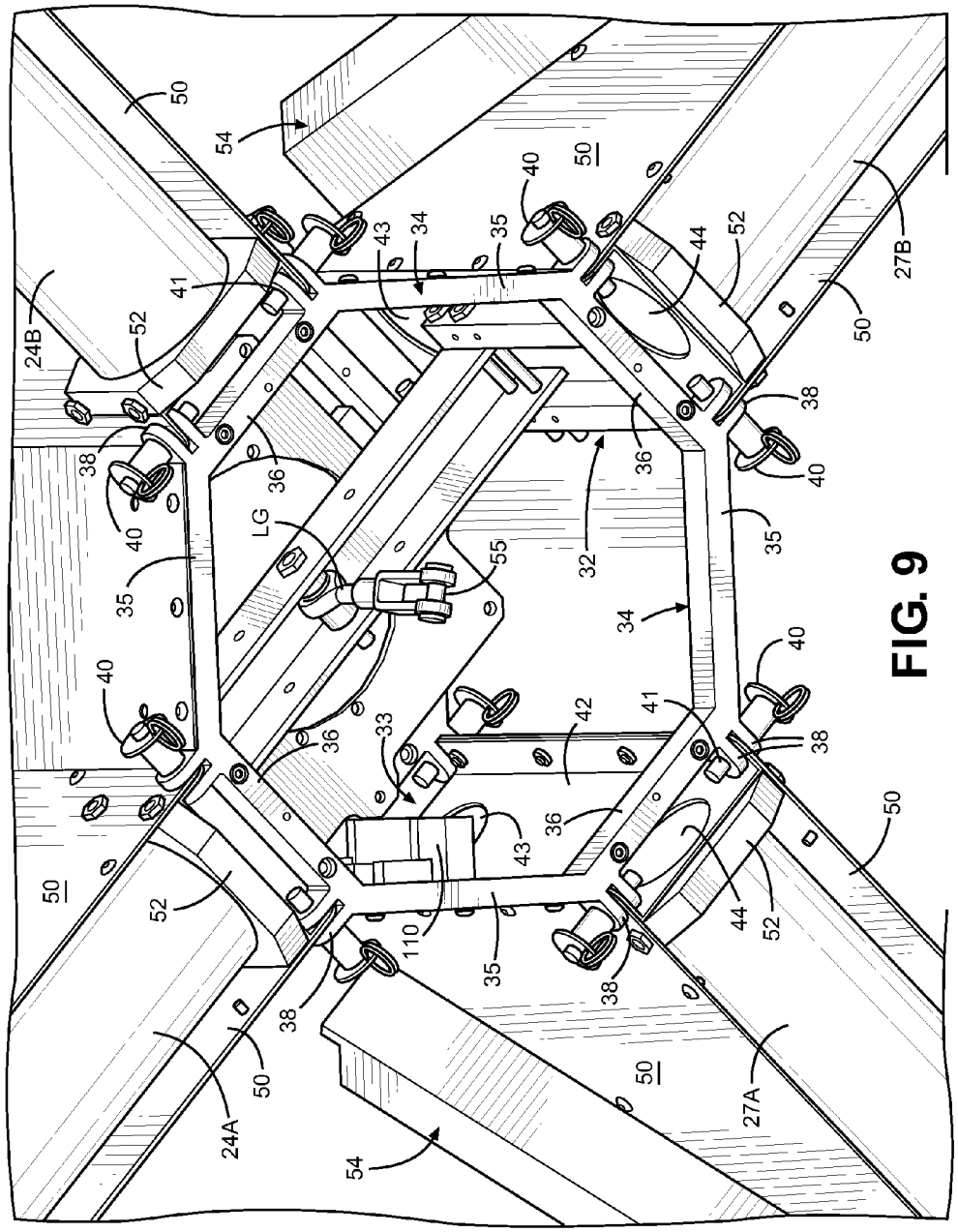
FIG. 9 is a bottom perspective view of the central housing of FIG. 8 showing the connection of the rotor support boom arms and a tether attachment in greater detail.

With reference to FIGS. 8 and 9, details of the central housing of the fuselage are shown in detail. As previously described, the housing is preferably fabricated from a combination of machined aluminum plates and formed sheets, but also could be fabricated from a multi-part or monolithic composite material. The center housing contains the avionics and computer systems necessary for FEG control, the electronics necessary to communicate with the ground, motor control electronics, and power conversion electronics. The housing includes a frame 32 having upper and lower ring members 33 and 34 of the same general shape. As shown, the rings have four equally sized straight sides 35 which are connected by diagonally extending corner members 36 each have two pair of spaced mounting lugs 38 extending outwardly from opposite ends thereof. The pairs of lugs have aligned openings therein for receiving locking pins 40. The locking pins include spring loading locking balls 41, which, after the pins are in place, extend outwardly of the pins to prevent withdrawal of the locking pins from the lugs 38 unless the balls are depressed within the pins.

Figure 10:
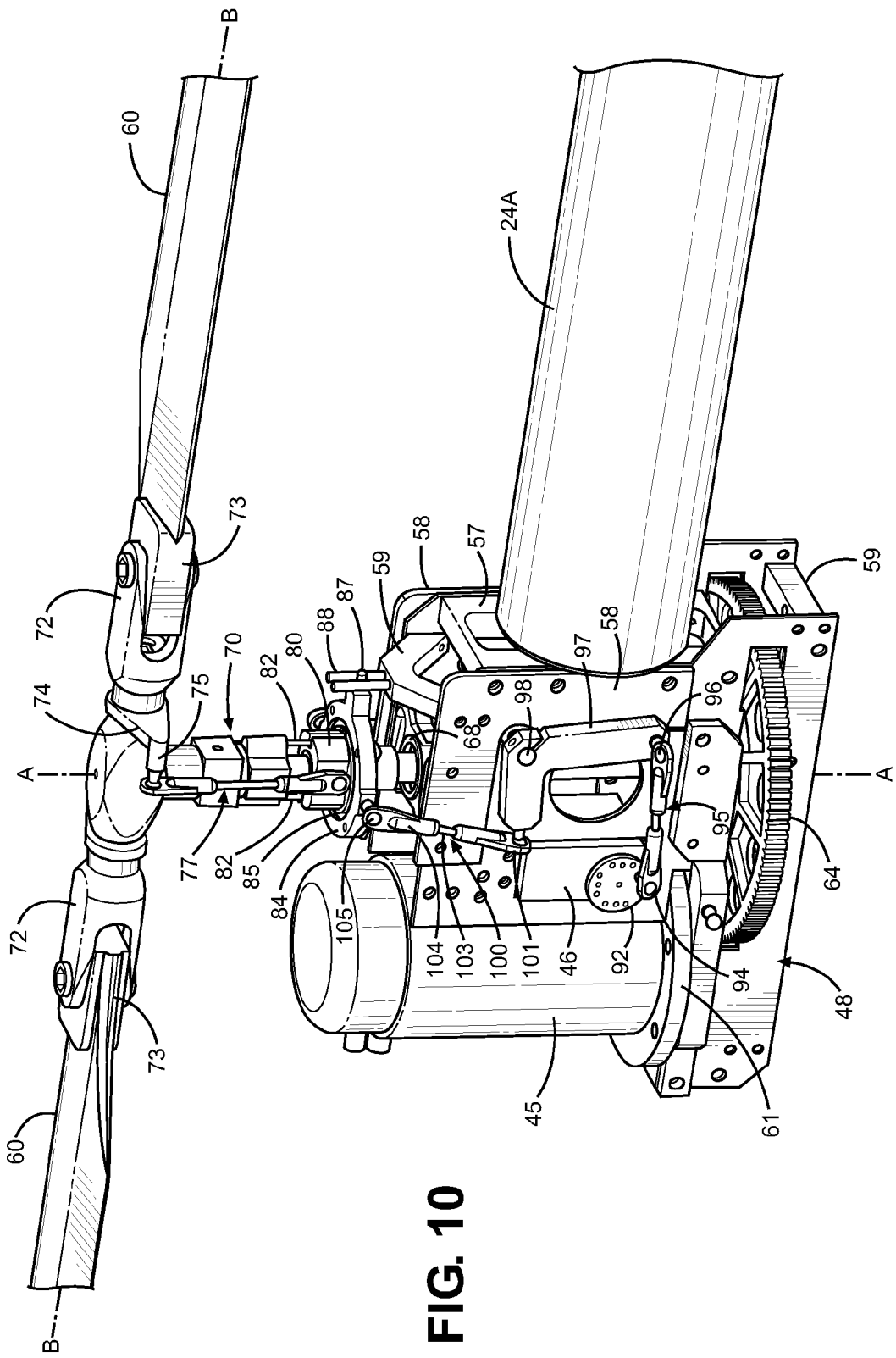
FIG. 10 is a side perspective view of one of the rotor mounting assemblies of the invention showing a motor for driving the rotor blades and for developing power for generation back to ground and also showing the mechanical pitch control devices for altering the pitch of the rotor blades.

The upper and lower frame rings are connected by generally U-shaped corner panels 42 which are retained in position by the lugs 38 and locking pins 40. The corner panels 42 including openings 43 and 44 for passage of electrical wire harnesses (not shown) to motors 45 and a rotor pitch control servo 46 which are mounted on rotor support assemblies 48 mounted at the ends of each of the two forward and two aft extending rotor support boom arms, as shown in FIG. 10.

To mount the four rotor support arms 24A, 24B, 27A and 27B to the central housing 26 of fuselage 25, their inner ends are positioned between pairs of reinforcing triangularly shaped panels 50. In the preferred embodiment, each arm is constructed as a hollow tubular boom structure formed of preferably round sectioned thin wall carbon fiber reinforced epoxy construction, though oval or other shape cross sections and other materials such as Kevlar or fiberglass composites or high strength aluminum alloys such as 6061 may also be used. Streamlined or airfoil cross-sectional tubing or composite structures may be used for the arms, and these may be oriented to give additional lift at certain pitch angles, especially when the FEG vehicle is in kite-like flight. To secure the arms to the central housing 26, a pair of aluminum lugs or collars 52 are bonded about the inner end of each arm and spaced approximately a foot from the inner end as shown in FIG. 8. The collars have flat outer edges with tapped holes for receiving screws used to secure the pair of panels 50 along the opposite sides of the arm. In FIG. 8, the right side panel 50 has been removed so as to show an inverted U-shaped reinforcing panel 51 which extends from the upper frame ring 33 diagonally outwardly and downwardly to a point of attachment with the collar 52. In this manner, the panels 50 and 51 provide for the cantilevered support for each arm of the fuselage.

With continued reference to FIG. 8, the FEG includes four motor controllers mounted within housings 54 with each controller being electrically connected to a rotor motor 45 and the rotor pitch control servos mounted on the same arm. The motor controller housings are mounted to the reinforcing panels 51, with one controller being removed to show the underlying panel 51 in FIG. 8. The controller housings protect the controllers from adverse ambient conditions during the use of the FEG.

Also shown in FIG. 9 is a tether connecting yoke 55 which is pivotally mounted to pin 56 carried by a reinforced beam element 58 mounted so as to be supported by the frame of the central housing. The yoke is preferably positioned at the center of gravity of the FEG.

Figure 11:
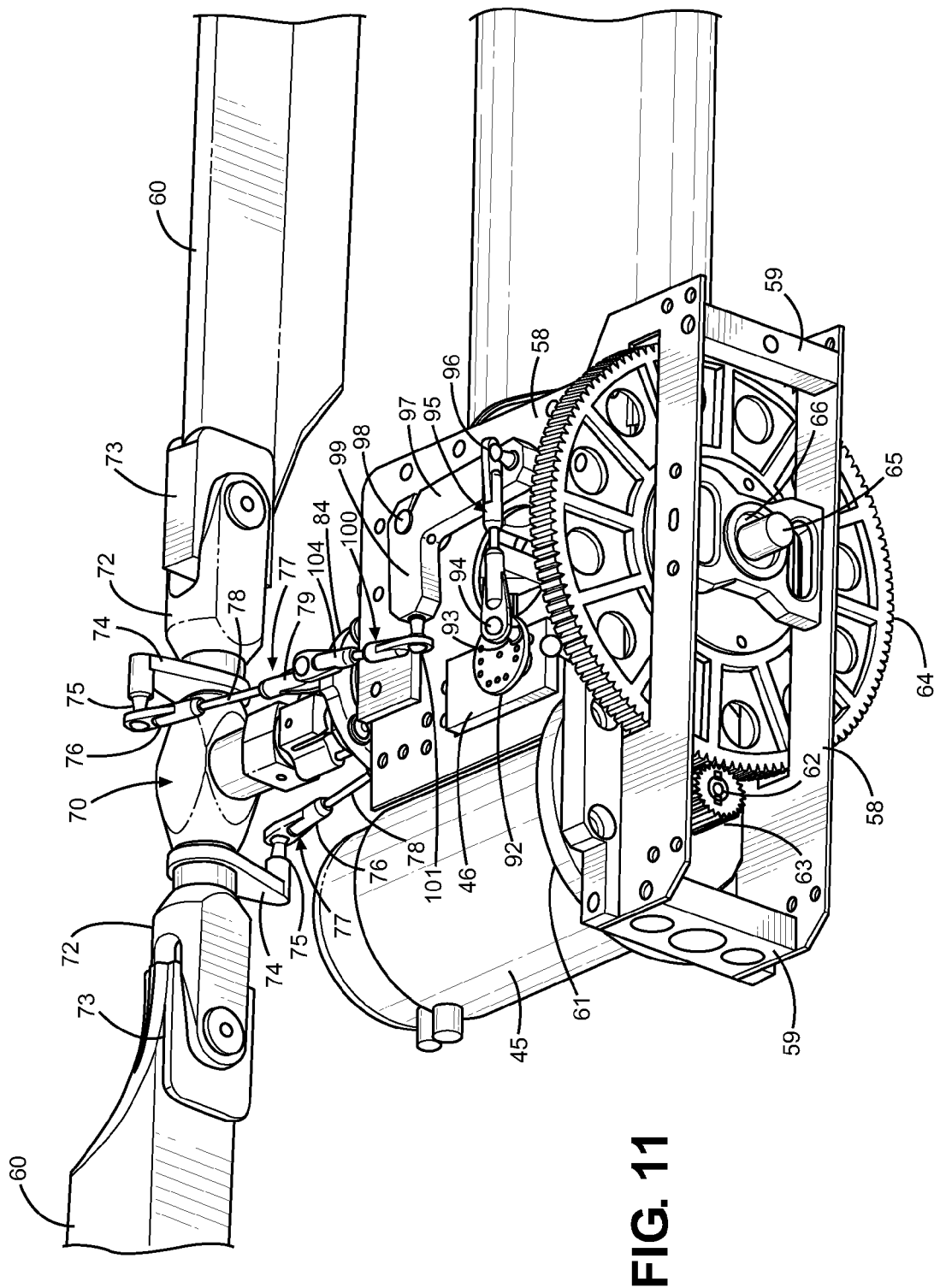
FIG. 11 is a bottom perspective view having portions broken away showing the rotor mounting assembly of FIG. 10 and the drive connection between the motor for the rotor blades and the rotor drive shaft.

With reference to FIGS. 10 and 11, the details of the rotor structures and controls will be described in detail. The motor 45 associated with each rotor is preferably a DC servo motor having inner permanent magnets which rotate within a series of coils. Power to and from the coils is controlled by the motor controllers. The motor controllers function as switching devices for permitting current flow to the motors from a ground power source connected thereto by electrical conductors which extend through the tether by way of which the FEG is connected to the ground anchor during flight. The current flow to the motors provides power to rotate the rotor blades 60 during ascent and descent, and at some other times, during a flight of the FEG. However, during power generation flight in a kite-like mode of the FEG, the voltage generated by a regenerative braking of the motor drive shaft due to the power of the wind against the blades 60, the motor controller switches to allow current to flow from the motor 45 to a ground level power grid, power storage device such as a battery or some other device to be electrically powered by the FEG. By way of example only, supposing power from the ground source has a maximum voltage of 400 volts. As wind places a load against the rotor blades there is a reverse load or torque placed on the motor drive shaft which increases the voltage being produced by a regenerative braking effect on the motor. When the reverse voltage exceeds 400 volts, the voltage controller switches current flow from the FEG to the collector grid or device at the ground or to some device to be powered from the FEG. When the power developed by the wind against the blades drops to a predetermined level, the controller switches current flow from the ground source back to the motor.

Each motor 45 is mounted to a rotor support assembly 48 which is fixedly secured to the outer end of a related fuselage boom arm. The outer end of the boom arm is reinforced by a connector 57 that is mounted partially within the outer portion of the arm. The connector is mounted between two opposing metal plates 58 which are connected by a plurality of spacer members 59. The plates are notched and a motor support platform 61 is secured to the notched portion of the plates. In some embodiments, the outer ends of the arms may include one or more collars similar to those described above for securing the inner portion of the arms to the central housing, which collars would be secured to the rotor support assembly.

Each rotor motor 45 has an output shaft 62 connected to a gear 63 that meshes with a larger gear 64 fixedly mounted to a rotor drive shaft 65. The lower end of the drive shaft 65 is mounted within a lower bearing 66 carried by a lower frame of the rotor support assembly 48. The drive shaft 65 also extends through a similar upper bearing 68 mounted to the rotor support assembly 48. The upper end of the drive shaft 65 is fixedly mounted to a rotor blade knuckle assembly 70 that rotates with the drive shaft and to which are mounted a pair of oppositely oriented bifurcated blade grip members 72 to which root portions 73 of the rotor blades are secured. Fixedly connected to each grip member is a lever 74 carrying a pitch horn 75 that is connected to an upper connector 76 of an adjustable ball joint linkage 77. The linkage 77 also includes a central threaded section 78 and a lower connector 79 that is connected to a vertically movable sleeve 80. The sleeve 80 is slidably movable along a pair of guide pins 82 that are secured and depend from the knuckle assembly 70. The sleeve 80, ball joint adjustment link 77, pitch horn 75, lever 74 and blade grip member 72 form a portion of a blade pitch adjustment assembly that is controlled by an on board computer 112 in response to flying conditions including wind speeds and directions, altitudes, torque conditions on the rotor motor and desired flying conditions such as whether the FEG is ascending or descending. It should be noted that both blade grips are connected to the movable sleeve 80 such that the pitch of each rotor blade is simultaneously adjusted.

The blade pitch adjustment assembly further includes a pitch control ring 84 that is fixedly mounted about the rotatable sleeve 80. A heavy duty bearing 85 is mounted to the ring and the sleeve 80 is rotatably mounted to the bearing such that as the ring is moved vertically relative to the blade drive shaft 65, the sleeve will be moved with the ring. As the sleeve moves up and down as it rotates with the blades, the ball joint linkage 77 will urge the lever 74 to rotate the blade grip connected thereto about an axis B-B that extends perpendicularly relative an axis of rotation A-A of the blade drive shaft to thereby change the pitch angle of the rotor blade. As shown, the pitch control ring 84 includes a guide pin 87 that extends between a pair of closely spaced vertically oriented guide pins 88 which prevent the ring from moving side to side relative to the blade drive shaft as the ring is raised and lowered relative thereto.

Control of the pitch control ring 84 is initiated by a pitch control servo motor 46 mounted to one of the side plates 58 of the rotor support assembly. The motor 46 drives a drive wheel 92 which is connected to a servo horn 93 extending from an end connector 94 of an adjustable ball joint linkage 95. The linkage 95 has a central threaded section and a spaced connector 96 pivotally mounted to a crank arm 97 which is fixed to a pivot shaft 98 that extends between the two side plates 58 of the rotor support assembly. The opposite end of the pivot shaft 98 is fixed to a lever, not shown, so that the lever on the opposite side of the blade support assembly will move concurrently with the upper end 99 of the crank arm 97 in order to control adjustable ball joint linkages 100, provided on opposite sides of the blade support assembly. The linkages 100 each include lower connectors pivotally connected at 101 to the upper end 99 of the crank arm and an opposite lever, not shown. The linkages 100 also include central threaded portions 103 and upper connectors 104 that are pivotally engaged with pivot members 105 mounted on opposite sides of the pitch control ring.

In operation of the pitch control assembly, in response to the servo motor 90, the linkage 95, located on only one side of the rotor support assembly, will move the crank arm 97 and the oppositely located lever with the pivot shaft 98 to either raise or lower the linkages 100 to raise or lower the pitch control ring and thereby cause a pitch adjustment to the rotor blade as previously described.

As previously noted, the spacing of the rotors of the FEG 20, as shown in FIGS. 6 and 7, is such that, in the direction of the wind shown by arrow "W", none of the back drafts from the front rotors adversely effects clean air entering the aft rotors.

The central housing structure 26 may also contain a reaction point for the tether, if the tether is a single point attachment. The single point tether must be attached at a point that is both the FEG center of gravity and the geometric center of the rotor swept areas. As the tension in the tether changes due to varying wind speeds, tether forces can disturb the vehicle stability if it is not attached at this point by generating moments that would induce rotation of the vehicle. The single point tether is preferred for smaller FEGs 20.

During use, the FEG 20 flies up from the ground and hovers as a multi-rotor helicopter, and for this part of the flight, the tightly clustered symmetric arrangement of rotors is preferred. For takeoff and hovering, the FEG consumes electric power which is provided from a power grid or a generator at ground level, depending on the application. Electric power from the ground is transmitted through conductors in the tether 31 and is used to create torque in the drive motors for each of the rotors. The drive motors and their controllers are designed to convert electric power coming up the tether from the ground into torque to turn the rotors, and also to convert excess torque available at the rotors into electrical energy to send down the same conductors in the tether for use on the ground. Rotors generate thrust by moving air downward, through the rotor blades. The amount of thrust is controlled either by rotational speed of the rotors, using a fixed pitch blade, or by varying the pitch of the blades while they are rotating at a constant rotational speed, or by a combination of the two techniques.

As the rotors create thrust, they require torque input to rotate. The amount of torque required times the rotational rate of the rotor is the power required to maintain that level of thrust. The torque input to keep the rotor turning and create thrust also results in a reaction torque from the air against the rotor. This torque is proportional to the thrust, and because there are pairs of rotors rotating in opposite directions, this torque is normally balanced if each rotor is producing the same thrust.

It is possible to control the FEG 20 rotation about a vertical axis, called yaw, by reducing the thrust of one pair of rotors rotating in one direction while increasing the thrust of another pair of rotors rotating in the opposite direction. If this is done to maintain the total thrust level constant, the FEG will only rotate in yaw, and maintain orientation about the pitch and roll axes, and its position. For the FEG to roll change orientation about the roll (longitudinal) axis or pitch (transverse) axis, the thrust is increased on the side of the FEG desired to rise, and decreased on the side desired to lower. Maneuvers can be combined as required, with roll, pitch and yaw rotations done simultaneously.

For the FEG 20 to climb, overall thrust is increased and the FEG accelerates upward, descending is the opposite. For the FEG to move laterally, it is rolled or pitched so that a portion of the overall thrust vector is inclined in the direction desired, this component of thrust will accelerate the FEG in that direction. Once the FEG 20 has accelerated to the desired travel speed in a direction, it is leveled out to maintain that speed. The FEG 20 is stopped by rolling and or pitching in the opposite direction to the velocity until the FEG has decelerated to zero speed.

Once the FEG 20 climbs to a predetermined altitude for generation of power using high velocity winds, it flies downwind to a position where the tether angle with the ground is acceptable for the wind conditions and space available. The horizontal component of the tension in the tether now reacts with the force of the wind on the FEG 20. The preferred configuration of the FEG 20 has a wider fuselage and rotor spacing at the aft than it does at the front, and will naturally rotate in yaw like a weather vane to face into the wind. This is caused by an unbalance in drag from the unequally spaced rotors on each side of the tether. As the vehicle yaws to face the wind, the drag on each side balances and the vehicle will maintain a heading. Next, the FEG 20 is commanded to gradually pitch up to a large angle of attack θ, see FIG. 4. The positive pitch angle of attack exposes the underside of the rotors to the wind. The thrust of the rotors now has a downwind component, plus a vertical component. The vertical component of thrust must remain equal to the FEG 20 weight plus the vertical component of tether tension where it attaches to the FEG 20 or the FEG 20 will climb or descend. Because the rotor area now exposed to the wind has increased, the thrust also increases. The larger the pitch angle, the larger the exposed area and the larger the thrust. As the FEG 20 angle of attack is increasing, the blade pitch of the rotors must be decreased to limit thrust increase, so that the vertical component of thrust does not increase. The inflow of the wind under the rotors applies a torque to the rotors, which drives them to a faster rotational rate, and this accelerating torque increases with reduced rotor blade pitch.

To prevent the rotors from accelerating to a faster rotational rate, the electric motors apply torque in the direction against this acceleration, which creates electric power that is sent down the conductors in the tether for use on the ground. This reverse torque due to the force of wind on the rotor blades is referred to as a regenerative braking process for the motors wherein the voltage being created by the braking process overcomes the voltage of the current being supplied from the ground through the tether. When this occurs, current flow is from the FEG 20 to the ground. The flow of current for each motor is controlled through the motor controllers which act like switches and which continuously monitor operative conditions within each permanent magnet DC motor of the FEG. When the pitch maneuver is complete, the FEG is flying like a kite, with a large pitch angle of attack, and the tether tension balancing the force of the wind on the FEG.

The transition from hovering flight to flying like a kite is done over a period of less than a minute. This is a simple increase in pitch from near zero to a large positive angle. During this transition the air flow around the FEG is changing. The air flow through the rotors is straight downward in hovering flight. This changes to a horizontal flow through the inclined rotor plane from underneath and continuing downwind of the rotor with an added downward component of velocity in kite-like flight. During flight of prior art FEGs, when an angle of attack of the rotors is at a relatively small angle θ, see FIG. 5, the downward component of the air flow emerging downwind of each forward rotor caused a reduction in thrust of an aft rotor mounted directly downwind of the forward rotor. This is because the downward component of flow behind the forward rotor changes the apparent wind direction for the aft rotor. The apparent wind experienced by an aft rotor downwind of a forward rotor has a downward component, which is equivalent to a relative reduction in pitch angle for that aft rotor. Reduction of pitch angle in the prior art FEGs thus reduced thrust that resulted in a rapid and uncontrolled increase in vehicle pitch. However, unlike the prior art, because of the spacing of the front rotors relative to the rear rotors of the FEG of the present invention is such that no air passing through the front rotors enters into the rear rotors, regardless of the angle of attack of the rotors, the rear rotors will always receive clean air and thus control of the FEG in flight is enhanced.

The FEGs of this invention can have any number of sets of four rotors, simply by adding pairs of counter-rotating rotors to the left and right of the core group of four rotors described above. The direction of rotation of the additional sets must follow the rules for the original set of four, and may be the same or opposite from the adjacent set of rotors, see the arrangement of FIG. 12 which is another embodiment of the present invention. In the FEG 150 of FIG. 12, the fuselage 136 has been extended and an additional pair of fore and aft counter rotating rotors 137, 138 and 139, 140 have been mounted outwardly of the set of four inner rotors. The rotors 137 and 138 are mounted at the free ends of fuselage forward arms or booms 141 and 142, respectively, and the rotors 139 and 140 are mounted on the free ends of fuselage aft arms or booms 143 and 144.

Figure 12:
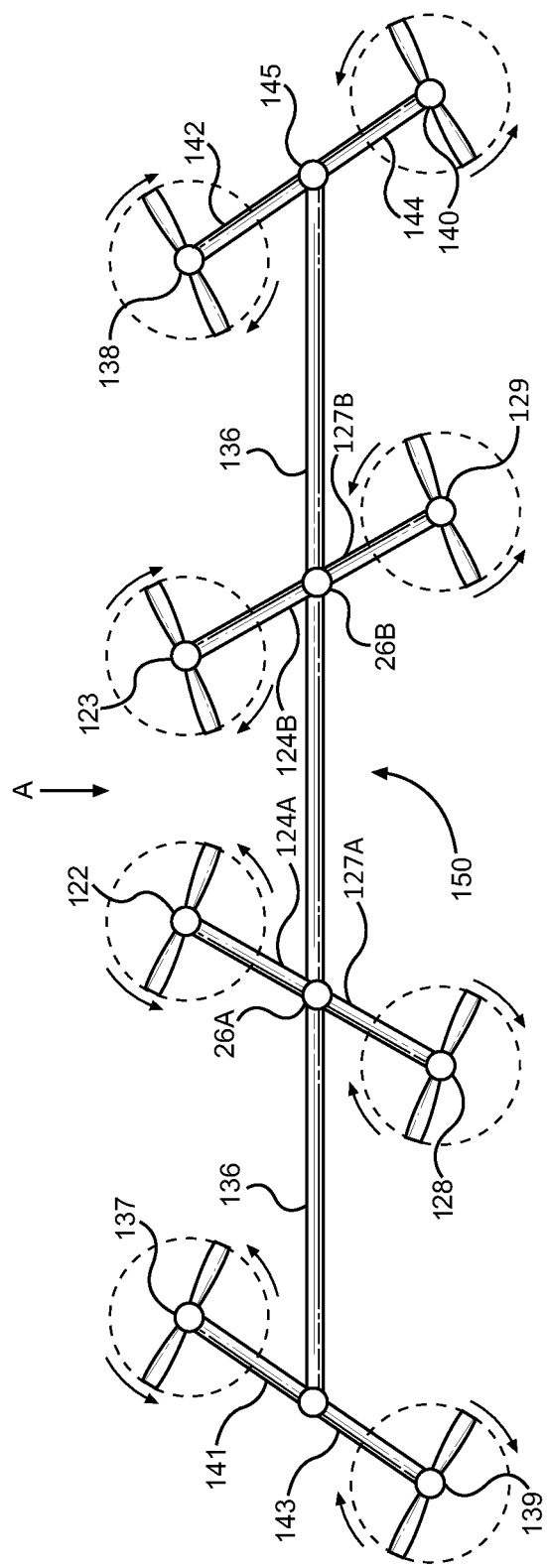
FIG. 12 is a top illustrational view of another embodiment of FEG in accordance with the teachings of the present invention wherein eight rotors are mounted on a fuselage in such spaced relationships that the fore or front rotors do not interfere with the clean wind flow to the rear or aft rotors.
Figure 13:
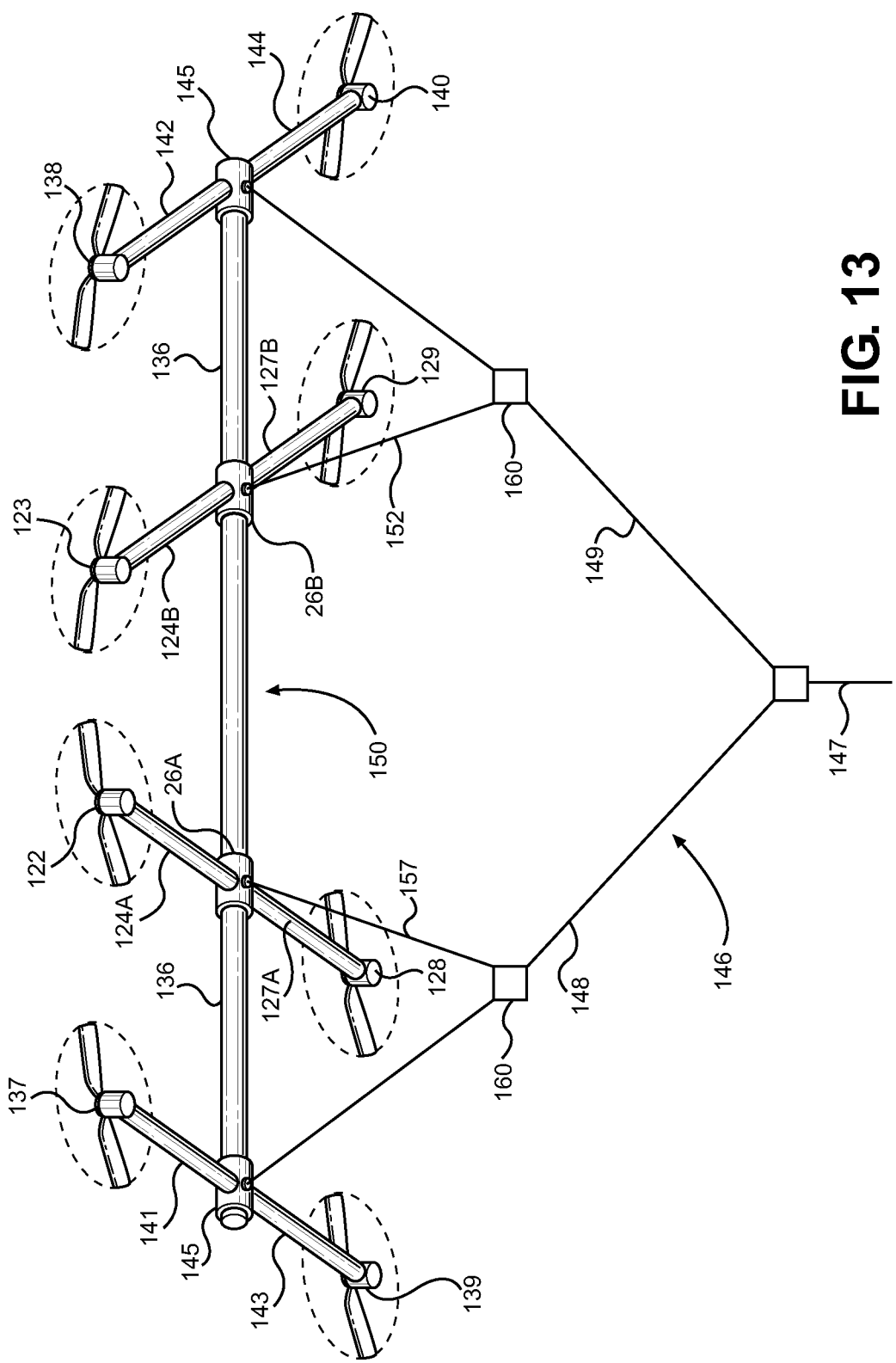
FIG. 13 is a bottom perspective view of the FEG of FIG. 12 showing a tethering arrangement for power conductor tethers between the FEG and the ground.

The rotors of the interior set of four rotors shown in FIGS. 12 and 13 include two closely spaced forward rotors 122 and 123 and two aft rotors 128 and 129 that are spaced outwardly of the forward rotors so as to receive clean air as has been previously described. The interior four booms include two forward boom arms 124A and 124B and two aft boom arms 127A and 127B. Further, as opposed to having the interior four booms extending from a single central housing 26 as described with respect to FEG 20, two spaced housings 26A and 26B are shown from which the central four booms extend. Although the central four booms may be oriented as shown in FEG 20, they are shown in FIGS. 12 and 13 with a varied orientation, however, the clean air spacing of the rotors discussed herein must be maintained between the fore and aft rotors. Thus, the spacing of the rotors in the embodiment of FIGS. 12 and 13 is such that, in the direction of the wind shown by arrow "A", none of the back drafts from the forward or fore rotors 137, 122, 123 and 138 adversely effects clean air entering the aft rotors 139, 128, 129 and 140.

The FEG 150 must have a method for one or more tethers to attach it to the ground. Also, there must be structure to support the FEG when landing on the ground and allow it to take off again. The fuselage of the FEG 150 must meet these requirements. There are several arrangements and structural configurations along with different materials and construction methods that can be used to construct the FEG 150 fuselage.

The fuselage of the FEG 150 includes housing structures 145, 26A and 26B, which are similar to those shown at 26 of FEG 20, but have only two boom arms extending therefrom, one forward and one aft. As shown, the rotors mounted to the forward booms are more closely spaced than the counter-rotating rotors mounted to the aft boom arms. The housings are preferably fabricated from a combination of machined aluminum plates and formed sheets, but also could be fabricated from a multi-part or monolithic composite material. The center section is used to contain the avionics and computer systems necessary for FEG control, the electronics necessary to communicate with the ground, the motor control electronics, and power conversion electronics. These will preferably be contained in sealed enclosures to prevent moisture and particulate contamination from damaging the function of the electronics.

As opposed to the single point tethers associated with the FEG 20, with respect to the larger FEG 150 of FIGS. 12 and 13, and others having more than the minimum four rotors, multiple tethers may be used to secure the FEGs to ground. These may be individual tethers each connected to the ground, or may be joined near the FEG with a bridle arrangement 146. As shown, the bridle includes a primary tether 147 to ground and two lateral tethers 148 and 149 anchored to the outer central housings 145 of the outer rotors of FEG 50. The bridle may be a balanced type as previously known or an actively controlled system including mechanisms 160 for adjusting the length of the bridle elements from the vehicle to the convergence points of the tether intersections shown in FIG. 13. As shown in FIG. 13, two additional tethers 151 and 152 are mounted between the lateral tethers 148 and 149 and the central housings 145 of the two pair of inner rotors.

Multiple tether attachments can save structural weight, as bending in the fuselage may be reduced or eliminated. For example, attaching the multiple tethers to the fuselage at or very near each rotor would react the wind forces on each rotor almost directly into the tether. Another approach locates the multiple attach points between each set of rotors, reducing the requirement for the fuselage to react to bending loads to the portion of the fuselage between those rotors. If the sets of rotors connected to each tether attach include one forward and one aft counter-rotating pair of rotors, and the tether attach points are along a transverse axis including the vehicle center of gravity and geometric center of rotor areas, then pitch maneuvers can be made without adjusting the length of the bridle elements, by adjusting rotor blade pitch only. This is advantageous as winching mechanisms used to change the length of bridle elements react slowly compared to changing rotor blade pitch. Quick response in changing FEG pitch angle is desirable to minimize the effect of gusts, which rapidly increase thrust and tether tension. Additionally, winching mechanisms are costly, use power and add weight to the FEG. This multiple tether attachment scheme would require adjustable length elements to achieve roll maneuvers. Roll angle variations are not necessary for tether tension relief and can be made more slowly, so winching control is acceptable.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

We claim:

1. A flying electric generator comprising a fuselage, wherein the fuselage includes a centralized housing, at least a first pair of boom arms extending forward from and laterally outwardly of the housing and have outer ends, at least a first pair of counter rotating first rotors being mounted along the outer ends of the at least first pair of boom arms, at least a second pair of boom arms extending aft and laterally outwardly from the housing and having outer ends, at least a first pair of second counter rotating rotors mounted along the outer ends of the at least second pair of boom arms and wherein each of the rotors is mounted to the fuselage such that when the at least first pair of first rotors are leading into the wind, each of the at least first pair of first rotors and the at least first pair of second rotors is positioned so as to receive a direct path to an undisturbed flow of wind regardless of angle of attack or pitch angle of the flying electric generator, and wherein the housing defines a center of gravity of the flying electric generator.

2. The flying electric generators of claim 1 wherein the at least first pair of first rotors are mounted in closely spaced relationship to one another and wherein the at least first pair of second rotors are mounted so as to be positioned laterally outwardly of the first pair of rotors relative to a center of the housing of the fuselage.

3. The flying electric generator of claim 2 wherein the at least first pair of boom arms are shorter in length than the at least second pair of boom arms.

4. The flying electric generator of claim 3 wherein the at least first pair of boom arms are spaced at a first angle relative to one another and an angle between the second pair of boom arms is greater than the first angle.

5. The flying electric generator of claim 1 wherein the at least first pair of boom arms are shorter in length than the at least second pair of boom arms.

6. The flying electric generator of claim 5 wherein the at least first pair of boom arms are spaced at a first angle of at least approximately 90° relative to one another and wherein an angle between the at least second pair of boom arms is greater than the first angle.

7. The flying electric generator of claim 1 including an even number of rotors mounted to extend forward from the fuselage and a same even number of rotors mounted to extend aft from the fuselage, and wherein a central pair of forward counter rotating rotors are mounted in a more closely spaced relationship to one another than a central pair of the aft counter rotating rotors which are mounted so as to be positioned laterally outwardly of the central pair of forward counter rotating rotors relative to a center of the fuselage.

8. The flying electric generator of claim 7 including each of the at least first and second pairs of rotors is drivingly connected to separate electric motors mounted at the ends of the at least first and second pairs of boom arms that extend forward and aft of the fuselage, respectively, separate motor controllers electrically connected to each of the motors, a pitch control assembly mounted to the ends of each of the first and second boom arms, each pitch control assembly including a servo motor for driving a first linkage system connected therefrom to a pitch control ring that is fixed in rotation about a sleeve that rotates with a rotor blade drive shaft that is connected in driven and driving relationship to the motor mounted to the respective boom arm, a second linkage system connected between the sleeve and pitch horns of a pair of rotor blades whereby vertical movement of the pitch control ring in response to changes in the first linkage system will cause vertical displacement of the sleeve and thus change in pitch of the rotor blades through the second linkage system.

9. The flying electric generator of claim 1 wherein each of the at least first and second pair of boom arms is formed as a tubular structure and means for reinforcing inner ends of each of the boom arms that are connected to the housing of the fuselage.

10. The flying electric generator of claim 1 including each rotor of the pair of the at least first and second of pair of rotors is drivingly connected to electric motors mounted at the ends of the at least first and second boom arms, separate motor controllers electrically connected to each of the motors, a pitch control assembly mounted to the ends of each of the first and second boom arms, each pitch control assembly including a servo motor for driving a first linkage system connected therefrom to a pitch control ring that is fixed in rotation about a sleeve that rotates with a rotor blade drive shaft that is connected in driven and driving relationship to the motor mounted to the respective boom arm, a second linkage system connected between the sleeve and pitch horns of a pair of rotor blades whereby vertical movement of the pitch control ring in response to changes in the first linkage system will cause vertical displacement of the sleeve and thus change in pitch of the rotor blades through the second linkage system.

* * * * *